United States Patent [19]

Hayasaka

[11] Patent Number: 4,831,299
[45] Date of Patent: May 16, 1989

[54] HOMOPOLE TYPE AC GENERATOR

[76] Inventor: Enakichi Hayasaka, No. 543-1, Ogikubo, Odawara-shi, Kanagawa-ken, Japan

[21] Appl. No.: 157,403

[22] Filed: Feb. 18, 1988

[30] Foreign Application Priority Data

Feb. 19, 1987 [JP] Japan .................................. 62-36050

[51] Int. Cl.[4] ............................................ H02K 17/00
[52] U.S. Cl. .................................................. 310/166
[58] Field of Search ................. 310/166, 168, 171, 178

[56] References Cited

U.S. PATENT DOCUMENTS 3,668,448 6/1972 Hayasaka ............................. 310/166

FOREIGN PATENT DOCUMENTS 59-49784 12/1984 Japan .
62-45787 9/1987 Japan .

OTHER PUBLICATIONS

Richter, Eike New Developments in Very High Speed Electrical Alternators, 1971 Intersociety Energy Conversion Engineering Conference, Aug. 1971.

Primary Examiner—Patrick R. Salce
Assistant Examiner—Judson H. Jones
Attorney, Agent, or Firm—Michael N. Meller

[57] ABSTRACT

An improvement of a homopole type AC generator which is of homopole type arrangement and is adapted to generate alternating current (AC) depending upon interlinkaging operation of magnetic fluxed comprising a rotor magnet rotatable by a rotational force from outside, a yoke through which magnetic fluxes flow from the N pole of the rotor magnet to the S pole and forms a part of a magnetic circuit, and generating coils provided at positions interlinking with the magnetic cirucit, wherein a magnetic circuit connecting two rotary pole pieces which are provided on a rotary drive shaft at both sides of the rotor magnet is disconnected to eliminate a harmful magnetic circuit opposing the action of generation.

3 Claims, 4 Drawing Sheets

HOMOPOLE TYPE AC GENERATOR

BACKGROUND OF THE INVENTION

The present invention generally relates to AC generators, and in particular to an improvement of a homopole type AC generator which is of homopole type arrangement and is adapted to generate alternating current (AC) depending upon interlinking operation of magnetic fluxes, wherein a magnetic circuit connecting two rotary pole pieces which are provided on a rotary drive shaft at both sides of a rotor magnet is disconnected to eliminate a harmful magnetic circuit opposing the action of generation.

PRIOR ART

The applicant proposed in the commonly owned U.S. Pat. No. 3,668,448 entitled "homopole type AC generator" a homopole type AC generator comprising a rotor magnet rotatable by a rotational force from outside, a yoke through which magnetic fluxes flow from the N pole of the rotor magnet to the S pole and forms a part of a magnetic circuit, and generating coils provided at positions interlinking with the magnetic circuit. The generating coils induce AC voltage so as to effect AC generation as the magnetic fluxes make magnetic engagement and disengagement with or from the generating coils during the rotation of the rotary magnet.

Further, the applicant proposed in the Japanese patent publication No. 59-49784 and the Japanese patent application No. 59-143713 which is a divisional application of the former and now decided for publication, a homopole type AC generator for effecting the AC generation according to the aforementioned principle and capable of improving the efficiency by increasing the energy difference during the change of the magnetic flux by using a magnetic material having very small residual magnetism.

The AC generator disclosed comprises a magnetic core fixed around a rotary drive shaft of a non-magnetic material, a permanent magnet having a semi-circular outer peripheral surface extending for an electrical angle of 180 degrees and carried on the core at an intermediate position thereof for unitary rotation therewith, a pair of pole pieces provided at both ends of the core for unitary rotation with the permanent magnet, and two sets of yoke pairs surrounding the permanent magnet as well as the pole pieces such that each pair of the yokes comprises a pair of diametrically opposing yokes which are disposed alternatively in axially displaced relation around the rotary drive shaft. Each of the yokes extends for an electrical angle of 180 degrees.

Such an AC generator, though capable of providing an improved efficiency of generation by eliminating the residual magnetism from the magnetic material, has a problem of decrease of the efficiency because of the formation of a harmful magnetic circuit which extends from one of the magnetic poles of the permanent magnet and returns to the other of the magnetic poles through a path connecting the magnet, a part of the core, one of the pole pieces, one and other yokes, the other pole piece, the other part of the core, and the magnet. This magnetic path acts as a counter magnetic circuit and opposes the change of the magnetic flux caused by the rotation of the rotary magnet. The efficiency of the generator is reduced correspondingly.

SUMMARY OF THE INVENTION

Accordingly, it is an general object of the present invention to provide a novel and useful improved homopole type AC generator wherein the problems aforementioned are eliminated.

Another and more specific object of the present invention is to provide a homopole type AC generator comprising a rotor magnet rotatable by a rotational force from outside, front and rear yoke pairs surrounding the rotor magnet in a displaced relation such that the front yoke pair and the rear yoke pair are respectively displaced to a front side and rear side of the rotor magnet along a rotary axis of the rotor magnet, the front and rear yoke pairs respectively forming front and rear magnetic circuits through which a magnetic flux is alternatively guided from one of the magnetic poles to the other of the magnetic poles responsive to the rotation of the rotor magnet, wherein the front and rear magnetic circuits are made independently to achieve an effective generation.

Still another object of the present invention is to provide a homopole type AC generator having a lesser degree of counter-acting electromotive force which opposes the generation, wherein the effect of the counter-acting electromotive force on the rotation of the rotor is minimized. According to the present invention, the change of the magnetic flux associated with entering and receding of the rotor magnets into and from the yokes is effectively utilized for generation and a highly efficient generation is achieved.

Other objects and further features of the present invention will be apparent from the following description when read in conjunction with the attached drawings.

DETAILED DESCRIPTION

First, a prior art homopole type AC generator will be described with reference to FIGS. 1A, 1B, 2A and 2B.

Figure 1A:
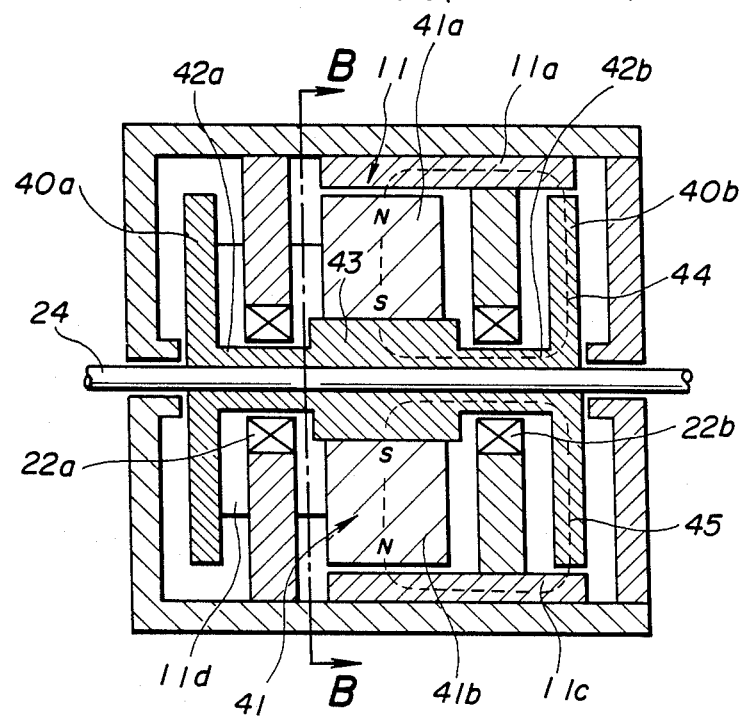
FIGS. 1A and 1B are longitudinal and transversal cross sectional views respectively showing a prior art homopole type AC generator proposed previously by the applicant.
Figure 1B:
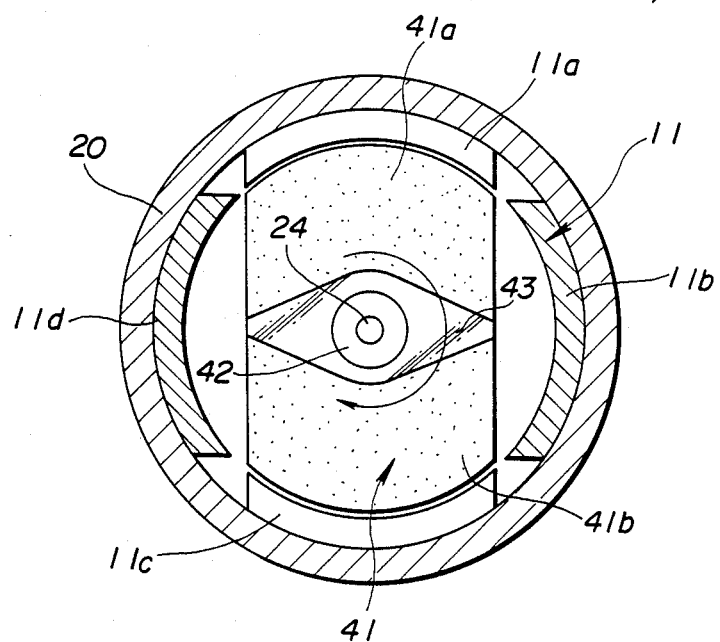

FIGS. 1A and 1B illustrate a homopole type AC generator previously proposed by the applicant. The generator comprises a stator 11 of a magnetic material which actually is constituted by yokes 11a–11d disposed along a circumference with a same distance from each other. Each of the yokes has a semi-circular inner periphery extending in a range of 180° in the electrical angle (90° in the mechanical angle). Further, the homopole AC generator comprises a rotor 41 including a pair of generally rectangular ferrite-based permanent magnets (high energy magnet) 41a and 41b disposed in a mutually opposing manner on a rotary drive shaft 24 such that the both of the magnets have the magnetic poles of the same kind at their semi-circular outer peripheries. The rotor also includes a pair of pole pieces 40a and 40b rotatable with the rotor magnets 41a and 41b and locating at both sides thereof in a separated manner along the direction of the rotary drive shaft 24. Each of the pole pieces has a corresponding semi-circular outer periphery extending for an angle equivalent to the angle of the outer periphery of the magnets which in turn correspond to the inner periphery of the yokes. Further, a pair of solenoid type generating coils 22a and 22b are wound around a portion of a magnetic body in a interlinking manner with a magnetic flux which is alternatively increased and decreased responsive to the revolution of the rotor. The homopole type AC generator uses a magnetic material having a very small residual magnetism for the yokes and the pole pieces to achieve an improved efficiency of generation. In the drawings, the reference numerals 42a and 42b designate reduced diameter core portions of the pole pieces 40a and 40b, and the reference numeral 43 designates a thick core portion formed between the front and rear reduced diameter core portions.

In this homopole type AC generator, it was found that, as a result of the reduction of the residual magnetism, a "cross-linking" or short circuiting magnetic circuit to be described is formed which deteriorates the efficiency of generation. It is a primary object of the present invention to eliminate this harmful magnetic circuit and improve the efficiency of the generator.

The AC generator illustrated in FIGS. 1A and 1B generates one cycle of AC current having a rectangular wave form responsive to the entering and receding of the rotary magnets 41a and 41b into and from the yokes 11a–11d which extend for an electrical angle of 180°. This type of AC generator is potentially capable of minimizing the induction of a counter-acting electromotive force which generally applies a counter torque to the rotor. Thus, this prior art AC generator has various advantages such that: (1) the change in the magnetic flux density caused by the entering and receding of the rotor magnet into and from the yokes can be fully utilized for the generation to realize a high generation efficiency; (2) the acceleration applied to the rotor due to the counter torque which is generated when the rotor magnet enters and recedes into and from the yokes is minimized to enable an extremely smooth rotation and a quick response; (3) the energy difference in the change of the magnetic flux is maximized by utilizing a heat treated magnetic material having a very small residual magnetism, and the like.

Figure 2B:
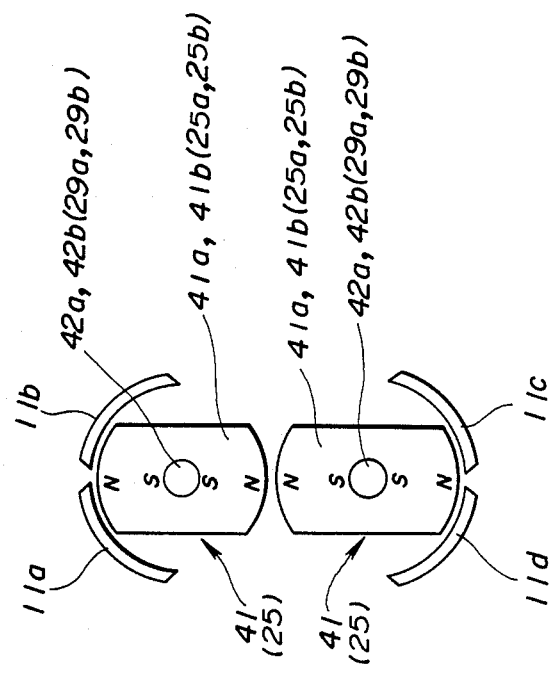
FIG. 2B is a development of the homopole type generator viewed from, the axial direction.
Figure 2A:
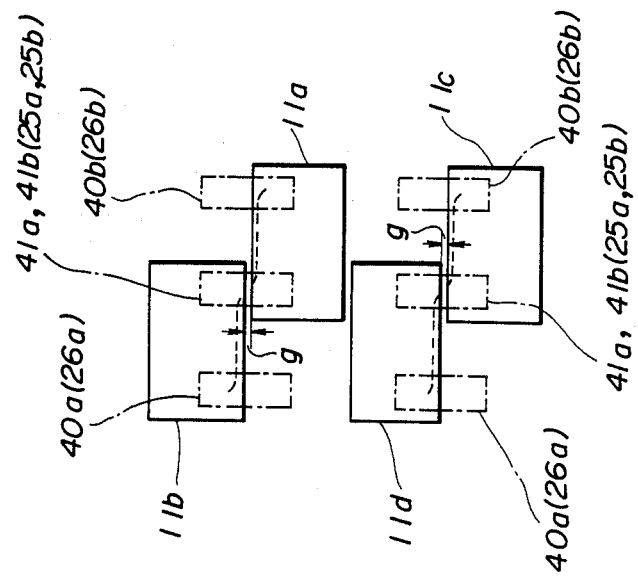
FIG. 2A is a development of the homopole type AC generator in FIGS. 1A and 1B schematically showing a plurality of yokes surrounding a rotor magnet and a pair of pole pieces at both sides of the rotor magnet for explanation of a magnetic path formed by connecting the yokes, rotor magnet,, and the pair of pole pieces.

Although this prior art AC generator described has such numerous advantages, it was found that the generator has a problem that a magnetic circuit which is unnecessary for the generation is formed connecting one of the pole pieces 40a and 40b of the rotor, a stator magnetic path (yokes 11a or 11b), a gap g between adjacent yokes, the other of the yokes 11a, 11b, the other of the pole pieces 40a, 40b, and the reduced diameter core portions 42a and 42b connecting the two rotor pole pieces 40a and 40b (see FIG. 2A). This magnetic circuit acts as an opposing magnetic circuit and reduces the induced voltage. The efficiency of the generator is reduced correspondingly.

Next, the operation of the prior art AC generator and the problem thereof will be described in detail.

Referring to FIGS. 2A and 2B, it can be seen that each of the stator yokes 11a–11d having a semi-circular inner periphery extends for a mechanical angle of 90°. Adjacent to the inner periphery of the yokes 11a–11d, the rotor magnet 41 and iron pole pieces 40a, 40b are disposed in a rotatable manner. It should be noted that FIG. 2A shows a view seen from the upper direction as well as a view seen from the lower direction of the generator for facilitating the understanding of the formation of this short circuiting magnetic circuit. Of course, it should be understood that there are only one each of the rotor 41, pole piece 40a and the pole piece 40b.

In a first state shown in FIGS. 1A and 1B, a magnetic circuit is formed along a path extending from the N-pole of the rotor magnet 41 (41a) and reaching to the S-pole of the same magnet 41 (41a) through the yoke 11a, pole piece 40b and the reduced diameter core portion 42b of the pole piece 40b. Similarly, another magnetic circuit is formed along a path extending from the N-pole of the rotor magnet 41 (41b) and reaching the S-pole of the rotor magnet 41 (41b) through the yoke 11c, pole piece 40b, and the reduced diameter core portion 42b of the pole piece 40b. These magnetic circuits interlink with one of the solenoid generating coils 22b.

As the rotor 41 rotates further by a mechanical angle of 90° in the direction shown in FIG. 1B, the former magnetic circuits are disengaged, and other magnetic circuits are formed along a path starting from the N pole of the rotor magnet 41 (41a) and returning to the S-pole of the magnet 41 (41a) through the yoke 11b, a pole piece 40b and the reduced diameter core portion 42b of the pole piece 40b, and along another path starting from the pole of the rotor magnet 41 (41b) and returning the S-pole of the magnet 41 (41b) through the yoke 11d, a pole piece 40a and the reduced diameter core portion 42a of the pole piece 40a. These magnetic circuits interlinkage with the other of the solenoid generating coils 22a. By further revolution of the rotor 41, these magnetic circuits are disengaged and the former magnetic circuits are engaged. Responsive to the engagement and disengagement of these magnetic circuits, the voltage is induced in the coils 22a and 22b. In this way, these magnetic circuits are used for the AC generation.

In the homopole type AC generator of this type, it is noted that the reduced diameter core portions 42a and 42b of the pole pieces 40a and 40b are magnetically connected to each other. Thus, the aforementioned short circuiting magnetic circuit is formed and causes an adverse effect on the generation. In other words, the magnetic flux passing through this magnetic circuit interferes the magnetic flux of the magnetic circuits necessary for the generation. More specifically, responsive to the electrical current flowing through the coils 22a and 22b, a magnetic flux is produced which passes a path connecting the reduced diameter core portion 42b, pole piece 40b, yoke 11a, the gap between the yoke 11a and the yoke 11b, the pole piece 40a (this portion is illustrated in FIG. 2A by a broken line), the reduced diameter core portion 42a of the pole piece 40a, and the reduced diameter portion 42b of the pole piece 40b. Similarly, another magnetic circuit is formed along a path connecting the reduced diameter core portion 42b, pole piece 40b, yoke 11c, the gap g between the yoke 11c and the yoke 11d, the yoke 11d, pole piece 40a (the portion described so far is illustrated in FIG. 2A with a broken line), the reduced diameter portion 42a of the magnetic pole 42a and the reduced diameter core portion 42b of the pole piece 40b.

As the rotor 41 rotates in the direction indicated in FIG. 1B from a position shown in FIG. 1A, the magnetic flux exiting from the N-pole of the magnet 41a and returning to the S-pole of the magnet 41a through the yoke 11b and the pole piece 40b decreases while the magnetic flux exiting from the N-pole of the magnet 41a and returning to the S-pole of the magnet 41a through the yoke 11b and the pole piece 40a increases. Responsive to this change of the magnetic flux, the electric current flows through the solenoid generating coils 22a and 22b in such a direction so as to prevent the change of these magnetic fluxes. Thus, the coils 22a and 22b generate a magnetic flux passing through the short circuiting magnetic circuit as described, starting from the reduced diameter core portion 42a of the pole piece 40a and returning thereto through the yoke 11b, gap g between the yokes 11b and 11a, the yoke 11a, the pole piece 40b, the reduced diameter core portion 42b and the reduced diameter core portion 42a. Similarly, another short circuiting magnetic circuit is formed starting from the pole piece 40a and returning thereto through the yoke 11d, the gap g between the yoke 11d and the yoke 11c, the yoke 11c, the pole piece 40b, the reduced diameter core portion 42b and the reduced diameter core portion 42a. The magnetic flux guided through these short circuiting magnetic circuit opposes the action of generation and reduces the efficiency of the generator.

Next, the homopole type AC generator of the present invention will be described.

Figure 3A:
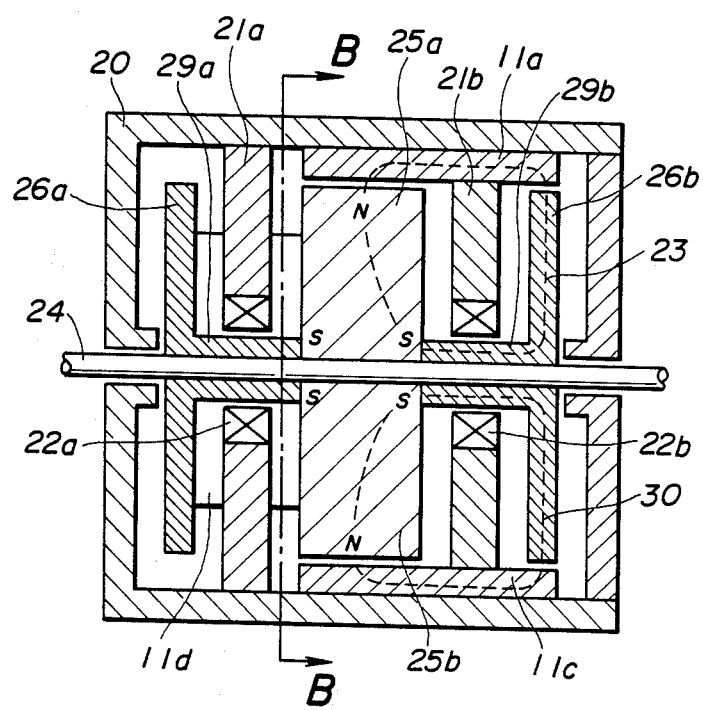
FIGS. 3A and 3B are longitudinal and transversal views respectively showing an embodiment of the homopole AC generator according to the present invention.
Figure 3B:
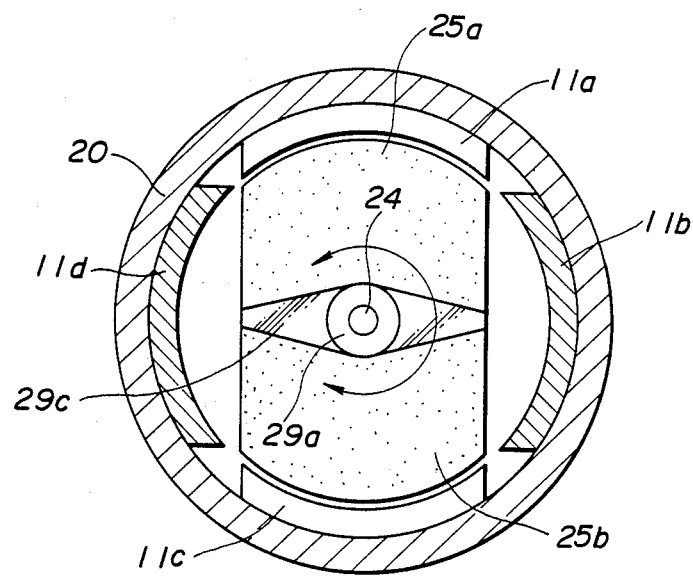

FIG. 3A is a longitudinal cross section showing an embodiment of the homopole type AC generator according to the present invention, and FIG. 3B is a transversal cross section showing the homopole type AC generator in FIG. 3A along a line B—B in FIG. 3A. In FIGS. 3A and 3B, those parts identically constructed to those corresponding parts in FIGS. 1A and 1B are given the identical reference numerals and the descriptions thereof will be omitted.

Figure 4:
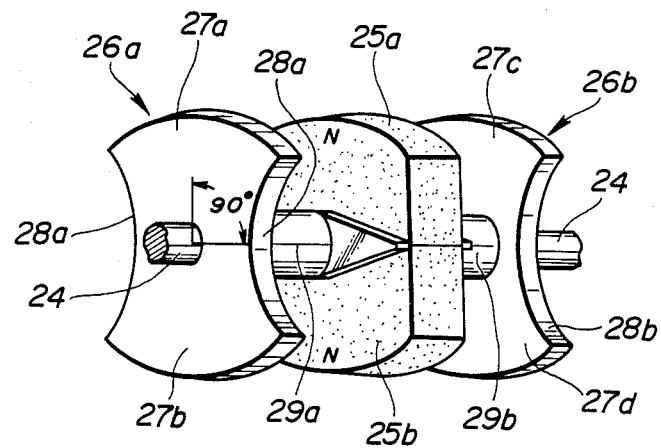
FIG. 4 is a perspective view showing the rotor magnet and the pair of pole pieces of the homopole type AC generator of the present invention.

Referring to the drawings, the rotary drive shaft 24 of a non-magnetic material carries a pair of generally rectangular rotor magnets 25a and 25b respectively having mutually opposing semi-circular outer peripher extending for a mechanical angle of 90° (corresponding to an electrical angle of 180°) as can be seen in FIGS. 3B and 4. The inner surfaces of the rotary magnets 25a and 25b are magnetized to have the S-pole and the aforementioned outer peripheries of the magnets 25a and 25b are magnetized to the N-pole. The rotor magnets 25a and 25b have a high magnetic energy and may be a ferrite or bromide based magnet commonly used for a radio wave absorber.

On the front side and the rear side of the rotor magnets 25a and 25b, the rotary drive shaft carries a pair of pole pieces 26 and 26b made of a magnetic material. The pole pieces 26a and 26b comprises semi-circular peripheries 27a, 27b, 27c and 27d each having a semi-circular form corresponding to the outer periphery of the rotary magnets 25a, 25b, cutout portions 28a and 28b formed in a generally orthogonal direction to the general directions connecting the pair of the semi-circular portions 27a, 27b, and 27c, 27d, and reduced diameter core portions 29a and 29b. The rotary drive shaft 24 penetrates through the reduced diameter core portions 29a and 29b and makes a contact directly with the rotor magnets 25a and 25b.

At the portions of the reduced diameter core portions 29a and 29b making contact with the front side and rear side of the rotor magnets 25a and 25b, there are provided collar portions 29c and 29d (not shown) for facilitating the magnetic interaction of the magnetic flux passing through the "cross-linking" magnetic path with the magnetic pole of the rotor magnets 25a and 25b.

The feature of the present invention is that the reduced diameter core portions 29a and 29b of the pole pieces 26a and 26b are separated from each other by means of the rotor magnets 25a and 25b, so that the short circuiting magnetic circuit connecting these pole pieces is disconnected.

Figure 5:
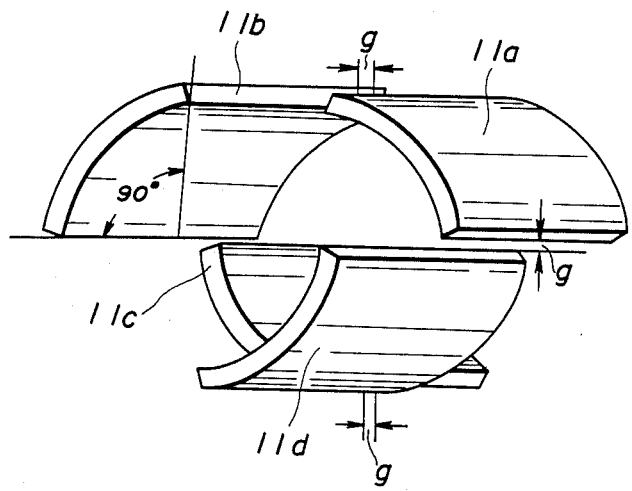
FIG. 5 is a perspective view showing a plurality of yokes of the homopole type AC generator of the present invention.

Referring to FIG. 3B, the yokes 11a–11d are fixed on an inner peripheral surface of a non-magnetic casing 20 with an arc length extending for a mechanical angle of 90°. Referring to FIG. 5, the yokes 11a–11d are arranged such that the pair of yokes 11a and 11c diametrically face each other and the pair of yokes 11b and 11d diametrically face each other. Further, the pair of yokes 11a and 11c are axially offset relative to the pair of yokes 11b and 11c so that the position of each of the yokes 11a, 11b, 11d and 11d are offset alternatively to the front and rear side of the generator. Further, it should be understood that each of the yokes 11a–11d are separated from each other by the small gap g.

The length of the yokes 11a–11b to the axial direction of the generator is chosen such that the yoke covers the entire length of the outer periphery of the rotor magnets 25a and 25b and further extend to cover the outer periphery of either one of the pole pieces 26a and 26b (FIG. 2A)

Referring to FIG. 3A again, coil holders 21a and 21b for carrying solenoid generating coils 22a and 22b are fixed to the inner periphery of yokes 11a–11d at an intermediate position between the rotor magnet 25a, 25b and the pole piece 26a and at an intermediate position between the rotor magnet 25a, 25b and the pole piece 26b. The solenoid generating coils 22a and 22b are mounted on the inner surface of the coil holders 21a and 21b in such a manner that they surround the reduced diameter core portions 29a and 29b without making a direct contact.

Next, the general operation of the homopole type AC generator of the present invention will be described.

Referring to FIGS. 3A and 3B, the magnetic flux from tee N-pole of the rotor magnet 25a reaches the S-pole of the rotor magnet 25a through the yoke 11a, semi-circular portion 27c of the pole piece 26a and the reduced diameter core portion 29b along a magnetic circuit 23. Similarly, the magnetic flux from the N-pole of the rotor magnet 25 reaches the S-pole of the rotor magnet 25b through the yoke 11c, semi-circular portion 27d of the pole piece 26b, and the reduced diameter core portion 29b along a magnetic circuit 30. The magnetic fluxes guided along the magnetic circuits 23 and 30 interlinkage with the solenoid generating coil 22b.

As the rotor magnets 25a and 25b rotate in the direction indicated by the arrow in FIG. 3B responsive to the rotation of the rotary drive shaft 24, the magnet 25a recedes from the yoke 11a and enters into the yoke 11b. At the same time, the magnet 25b recedes from the yoke 11c and enters into the yoke 11d. As a result, a magnetic circuit (not shown) is formed which guides the magnetic flux from the N-pole of the magnet 25a to the S-pole along a path connecting the yoke 11b, the semicircular portion 27a of the pole piece 26a, and the reduced diameter core portion 29a. Similarly, another magnetic circuit (not shown) is formed which guides the magnetic flux from the N-pole of the magnet 25b to the S-pole thereon along a path connecting the yoke 11d, the semi-circular portion 27b of the pole piece 26a, and the reduced diameter core portion 29a. The magnetic fluxes passing through these magnetic circuits interlink with the solenoid generating coil 22a.

As the rotor magnets 25a and 25b rotate from the position shown in FIG. 3B by a mechanical angle of 90°, the magnetic fluxes from the rotary magnets 25a and 25b engages with the yokes 11b and 11d and the magnetic fluxes disengages with the yokes 11a and 11c. Responsive to this engagement and disengagement of the magnetic flux, an AC voltage having a rectangular wave form is induced in the generating coils 22a and 22b interlinking with the magnetic flux.

Thus, in the homopole type AC generator of the present invention, one cycle of the electrical voltage is induced in a single generating coil responsive to the entering and receding of the rotor magnet into and from the yokes which respectively correspond to the engagement and disengagement of the magnetic flux. In other words, one cycle of alternating voltage is induced in the generating coil responsive to the engagement and disengagement of the magnetic flux.

It should be noted that the direction of the magnetic flux passing through the yokes 11a and 11c is opposite to the direction of the magnetic flux passing through the yokes 11b and 11d. This reduces the generation of the counter-acting electromotive force and thereby the torque which counter-acts the movement of the rotor is minimized. Further, the changes of the magnetic flux density corresponding to the entering and receding of the rotor into and from the yokes are equally utilized for the generation, which leads to a quite high efficiency of generation. Additionally, the driving of the generator can be made quite smoothly as the yokes are disposed with an identical interval and the acceleration applied to the rotary drive shaft as a result of the engagement and disengagement of the magnetic flux with the yokes is minimized.

Next, description will be given on the elimination of the aforementioned "cross-linking" or short circuiting magnetic circuit with reference to FIGS. 2A, 2B, 3A and 3B. In FIGS. 2A and 2B, the reference numerals in the brackets designate the parts pertinent to the generator of the present invention.

As previously describe and clearly illustrated in FIG. 3A, the homopole type AC generator of the present invention has a pair of pole pieces 26a and 26b which are magnetically disconnected by the rotor magnets 25a and 25b. In other words, the harmful magnetic circuit described previously with reference to FIG. 2A is eliminated. Therefore, the magnetic circuits formed in the AC generator of FIG. 3A are limited to those magnetic circuits necessary for the generation. As already described, these magnetic circuits are: the one extending from the N-pole of the rotor magnet 25a and returning to the S-pole of the magnet 25a through the path connecting the yoke 11a, the pole piece 26b and the reduced diameter core portion 29b of the pole piece 26b; the one extending from the N-pole of the rotor magnet 25a and returning to the S-pole of the magnet 25a through the path connecting the yoke 11c, the pole piece 26b and the reduced diameter core portion 29b of the pole piece 26b; the one extending from the N-pole of the rotor magnet 25a and returning to the S-pole of the magnet 25a through the path connecting the yoke 11b, the pole piece 26a and the reduced diameter core portion 29b of the pole piece 26a; and the one extending from the N-pole of the rotor magnet 25b and returning to the S-pole of the rotor magnet 25b through the path connecting the yoke 11d, the pole piece 26a and the reduced diameter core portion 29a of the pole piece 26a. These four magnetic circuits are formed alternatively responsive to the rotation of the rotor magnet.

In a particular position of the rotor shown i FIG. 2B in which the pole pieces 26a and 26b respectively engage magnetically with the yokes 11b and 11a simultaneously, all four of these magnetic circuits are formed simultaneously. In this state, however, the magnetic circuit shown in FIG. 2A by the broken line connecting the reduced diameter core portions 29a and 29b of the pole pieces 26a and 26b is disconnected by the rotor magnets 25a and 25b and the opposing action to the generation is eliminated.

The teaching of the present invention to disconnect the magnetic circuit between the pole pieces 25a and 25b in order to eliminate the harmful short circuiting magnetic circuit and to improve the efficiency, is also applicable to other the homopole type AC generators having different arrangement of the rotor magnets 25a and 25b proposed by the applicant previously.

Further, the present invention is not limited to these embodiments, but various variations and modifications may be made without departing from the scope of the present invention.

What is claimed is:

1. A homopole type AC generator comprising:
a rotary drive shaft of a non-magnetic material rotatable by a rotational force from tee outside;
a pair of magnets fixedly carried on the rotary drive shaft to form a rotor, each of the magnet is being disposed in a diameterically opposing manner such that a same kind of magnetic pole is located on a pair of diameterically opposing outer peripheries of the rotor and the other kind of magnetic pole is located adjacent to the rotary drive shaft;
a plurality of yokes forming a stator each extending for an electrical angle corresponding to the outer periphery of the rotor and disposed on a circumfernece to surround the rotor with an identical distance from each other, each of the yokes being displaced alternating to a front side and a rear side of the AC generator along the rotary drive shaft;
a pair of pole pieces carried on the rotary drive shaft in the front side and rear side of the rotor for rotation therewithin, each of the pole pieces having a pair of diameterical opposing outer peripheries extending for an electrically angle corresponding to those of the yokes such that a magnetic flux exiting from the magnetic pole at the periphery of the rotor is received by the corresponding yoke and guided to the outer magnetic pole through the pole piece cooperating with the yoke; and
a solenoid generating coil wound around a portion of the pole piece guiding the magnetic fluix to the other pole of the rotor magnet in an interlinking manner with the magnetic flux which changes the density responsive to the rotation of the rotor, wherein said rotor magnet is carried on the rotary drive shaft directly, and said front side and rear side pole pieces have front side and rear side reduced diameter core portions respectively surrounding the rotary drive shaft and extending toward the direction of the magnets along the rotary drive shaft, said pair of magnets and said front side and rear side reduced diameter core portions being carried on the rotary drive shaft directly whereby the front side and rear side diameter core portions contact front and rear surfaces of the rotary magnets respectively.

2. A homopole type AC generator as claimed in claim 1 in which a surface of said rotor magnet adjacent to the rotary drive shaft is magnetized to the S-polarity and the outer periphery thereof is magnetized to the N-polarity.

3. A homopole type AC generator as claimed in claim 1 in which said rotor magnet is a ferrite or bromide based magnet having a high magnetic energy.

* * * * *